(12) United States Patent
Hasegawa et al.

(10) Patent No.: US 6,620,493 B2
(45) Date of Patent: Sep. 16, 2003

(54) REFLECTION-REDUCING FILM

(75) Inventors: Hiroaki Hasegawa, Fukui (JP);
Masahiro Saitou, Fukui (JP);
Munetake Tajima, Fukui (JP);
Hirokazu Hasimoto, Fukui (JP)

(73) Assignee: Fukuvi Chemcial Industry Co Ltd, Fukui-ken (JP)

( * ) Notice: Subject to any disclaimer, the term of this patent is extended or adjusted under 35 U.S.C. 154(b) by 61 days.

(21) Appl. No.: 09/798,933

(22) Filed: Mar. 6, 2001

(65) Prior Publication Data
US 2001/0031317 A1 Oct. 18, 2001

(30) Foreign Application Priority Data

Mar. 7, 2000 (JP) .................... 2000-062621
Oct. 6, 2000 (JP) .................... 2000-308275
Jan. 26, 2001 (JP) .................... 2001-019097

(51) Int. Cl.$^7$ ............... B32B 3/10; B32B 27/00; B32B 9/00; G02B 1/11; G02B 1/10; C03C 17/34
(52) U.S. Cl. ............... 428/220; 428/349; 428/212; 428/327; 428/428; 428/447; 428/701; 428/421; 428/180; 359/586; 351/163
(58) Field of Search ............... 428/220, 349, 428/212, 327, 428, 447, 701, 421, 180; 359/586; 351/163

(56) References Cited

U.S. PATENT DOCUMENTS 4,765,729 A * 8/1988 Taniguchi .............. 351/163
6,051,665 A * 4/2000 Yamada et al. ......... 525/475
6,129,980 A * 10/2000 Tsukada et al. ........ 313/479
6,153,127 A * 11/2000 Nakamura et al. ...... 252/584
6,210,858 B1 * 4/2001 Yasuda et al. .......... 348/834

* cited by examiner

Primary Examiner—Cynthia H. Kelly
Assistant Examiner—Kimberly T. Nguyen
(74) Attorney, Agent, or Firm—Sherman & Shalloway

(57) ABSTRACT

A reflection-reducing film formed by being applied onto the surface of a substrate having light transmitting property, and including a base layer formed on the surface of said substrate and a surface layer formed on the upper side of said base layer, wherein:

said base layer has a thickness of from 50 to 200 nm; and
said surface layer is formed of a hydrolyzed product of a silane compound represented by the following formula (I), $$R_n\text{—Si(X)}_{4-n} \qquad (I)$$

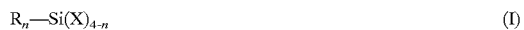

wherein R is a substituted or unsubstituted alkyl group or an alkenyl group, X is a hydrolyzable group, and n is a number of 1 or 2, a metal chelate compound and a silica sol, and has a thickness of from 50 to 200 nm. The reflection-reducing film is easily formed on a light-transmitting substrate by applying a multi-layer coating thereon, and exhibits an excellent liquid resistance.

14 Claims, 3 Drawing Sheets

REFLECTION-REDUCING FILM

BACKGROUND OF THE INVENTION

1. Field of the Invention

The present invention relates to a reflection-reducing film having excellent liquid resistance and, more specifically, to a reflection-reducing film formed by coating the upper surface of a light transmitting substrate to impart liquid resistance against liquids such as tap water, sweat, etc.

2. Description of the Prior Art

A reflection-reducing film has been extensively used for the panels that serve as optical display surfaces in the devices such as CRT, LCD and plasma display. These reflection-reducing films are generally formed by vacuum vaporization, method, sputtering method or wet coating method.

There has also been known a reflection-reducing film comprising plural layers formed on a plastic substrate. For example, Japanese Patent Laid-Open No. 288202/1997 discloses a reflection-reducing film comprising a plastic substrate having light-transmitting property, a layer of a high refractive index applied onto the substrate, a reflection-preventing layer applied onto the layer of a high refractive index, and a coated layer formed on the reflection-reducing film. In this reflection-reducing film, the layer of a high refractive index comprises, as chief components, a metal alkoxide, a colloidal metal oxide and/or a metal halide, the reflection-reducing layer comprises an amorphous fluorine-contained resin having a refractive index ($n_D$) of not larger than 1.36, and the coated layer comprises an organic polysiloxane as a chief component and a fluorine-contained material having a surface-activating ability. This prior art teaches that the reflection-reducing film is excellent in abrasion resistance, scratch resistance, adhesiveness and light transmission property.

The known reflection-reducing film is satisfactory from the standpoint of preventing reflection but is not still satisfactory from the standpoint of durability and, particularly, liquid resistance, and is subject to be deteriorated by various liquids while it is being used for extended periods of time resulting in the occurrence of a so-called film peeling.

That is, the first layer (surface layer) of the reflection-reducing film contains silica ($SiO_2$) as a main component to satisfy the requirement of hardness but tends to be dissolved upon contact with an acid or an alkali. The reflection-reducing film is corroded by, for example, sodium hypochlorite contained in the tap water, by acid or alkali contained in the sweat, and by sodium ions contained in the spray of seawater.

In the case of cellular phones, in practice, a problem is arousing in that the reflection-reducing film is easily peeled off the liquid crystal display unit due to the adhesion of sweat from the ear.

SUMMARY OF THE INVENTION

It is therefore an object of the present invention to provide a reflection-reducing film which can be easily formed on the light transmitting substrate by applying a multi-layer coating thereon and which exhibits excellent liquid resistance.

Another object of the present invention is to provide a reflection-reducing film having a non-glaring (glare-preventing) function capable of effectively blurring the transmitted image only.

A further object of the present invention is to provide a reflection-reducing film featuring excellent light resistance and capable of effectively preventing the film from being peeled even after used for extended periods of time.

According to the present invention, there is provided a reflection-reducing film formed by being applied onto a surface of a substrate having light transmitting property, and including a base layer formed on the surface of the substrate and a surface layer formed on an upper side of the base layer, wherein:

the base layer has a thickness of from 50 to 200 nm; and
the surface layer is formed of a hydrolyzed product of a silane compound represented by the following formula (I),

$$R_n\text{—}Si(X)_{4-n} \qquad (I)$$

wherein R is a substituted or unsubstituted alkyl group or a substituted or unsubstituted alkenyl group, X is a hydrolyzable group, and n is a number of 1 or 2, a metal chelate compound and a silica sol, and has a thickness of from 50 to 200 nm.

The reflection-reducing film of the present invention includes at least two layers, i.e., a base layer formed on the surface of the substrate and a surface layer formed on the upper side of the base layer. However, an intermediate layer having a thickness of 50 to 200 nm may be provided between the base layer and the surface layer.

In the present invention, a feature resides in that the surface layer contains a hydrolyzed product of a silane compound of the above formula (I) and a metal chelate compound. This imparts liquid resistance to the reflection-reducing film that is formed by the wet method.

Reference should be made to Examples described later. A reflection-reducing film (Comparative Example 1) having a surface layer which comprises, as a chief component, the hydrolysis of an ethyl silicate (tetraethoxysilane) dissolves when it is immersed in the tap water, saline solution or artificial sweat solution.

On the other hand, the reflection-reducing films (Examples 1 to 3) having a surface layer 1 formed of a hydrolyzed product of a compound of the formula (I) and a metal chelate compound, do not at all dissolve even when they are immersed in these liquids, and exhibit markedly excellent liquid resistance.

Besides, the surface layer has a small refractive index, which is a markedly excellent property.

It is considered that the improvement in the liquid resistance according to the present invention stems from a chemical structure of the silane compound (silane coupling agent) of the formula (I). That is, the compound of the formula (I) has two to three hydrolyzable groups (X) bonded to a silicon atom, and one to two organic groups (substituted or unsubstituted alkyl groups or alkenyl groups R) bonded to the silicon atom.

When the silane coupling agent is hydrolyzed, two to three hydrolyzable groups undergo the hydrolysis to form a two-dimensional or three-dimensional siloxane bond. It is here considered that one or two organic groups (R) remain, and the combination of these organic groups (R) and the siloxane bond contribute to improving the liquid resistance. Further, the metal chelate compound exists on the surface layer of the reflection-reducing film of the invention and, hence, a crosslinked structure is introduced into the surface layer to further improve the liquid resistance of the surface layer.

Further, the organic groups (R) in the silane coupling agent improves the adhesion or intimate adhesiveness to the intermediate layer or to the base layer, improving the degree of coupling in the interface to the silica fine particles blended in the surface layer. Therefore, the surface layer formed of the silane coupling agent used in the invention exhibits excellent liquid resistance against the tap water, artificial sweat solution and saline solution.

In the present invention, it is desired that the silica sol contained in the surface layer has a refractive index of as low as not larger than 1.44. Upon containing the silica sol having an average particle diameter of from 5 to 200 nm, in particular, the refractive index of the surface layer can be decreased to be not larger than 1.44.

In the reflection-reducing film of the three-layer constitution having an intermediate layer provided between the surface layer and the base layer, it is desired that the intermediate layer contains a metal alkoxide, a hydrolyzed product of a silane coupling agent and a silica sol.

In the present invention, the intermediate layer is formed of the metal alkoxide and the hydrolyzed product of the silane coupling agent. Therefore, the intermediate layer exhibits an enhanced refractive index, improved film strength and improved liquid resistance. Further, the intermediate layer blended with the silica sol exhibits improved adhesiveness (bonding force) to the surface layer and to the intermediate layer.

In the reflection-reducing film of the invention, it is desired that the surface layer has a refractive index smaller than that of the base layer, e.g., has a refractive index of as low as not larger than 1.44. In the reflection-reducing film of the three-layer structure having the intermediate layer, further, it is desired that the intermediate layer has a refractive index of as high as not smaller than 1.75 and the base layer has a refractive index that lies between those of the surface layer and the intermediate layer.

Due to the gradient of the refractive indexes compounded by the thicknesses of the above-mentioned layers (each layer has a thickness of from 50 to 200 nm), both a high light transmission factor (usually, not smaller than 97%) and a low light reflecting property (usually, not larger than 3%) are obtained.

In the present invention, further, it is desired that the base layer is formed on the surface of the substrate through the hydrolysis of the silane coupling agent from the standpoint of obtaining excellent adhesiveness to the substrate and preventing photocatalytic action.

In the reflection-reducing film having the three-layer structure including the intermediate layer, further, it is desired that fine particles having an average particle diameter of from 50 to 1000 nm and, particularly, from 100 to 500 nm are dispersed in the base layer and in the surface layer. The reflection-reducing film having layers in which fine particles are dispersed exhibits excellent non-glare function, does not blur the transmitted image but effectively blurs the reflected image only, making it possible to strikingly improve easiness of viewing the optical display surface.

In the reflection-reducing film of the three-layer structure, further, the refractive index of the intermediate layer is improved usually by blending the intermediate layer with a titanium dioxide (TiO$_2$) component. According to the study conducted by the present inventors, however, it was learned that the titanium dioxide component and, particularly, the anatase-type titanium dioxide causes the reflection-reducing film to be deteriorated by light.

The titanium dioxide and, particularly, the anatase-type titanium dioxide is usually called optical catalyst or optically reactive semiconductor, forms electron-positive hole pairs upon the irradiation with ultraviolet rays of wavelengths of chiefly not longer than 400 nm to trigger a photocatalytic reaction.

If described in connection with this point, a photo-semiconductor metal oxide as represented by TiO$_2$ knocks out electrons from a band of valence electrons into a conduction band (excited) when it is irradiated with light having energy larger than a band gap (energy gap between the band of valence electrons and the conduction band) thereof, and particles (positive holes) having positive electric charge are formed in the band of valence electrons. Electrons (e$^-$) and positive holes (p$^+$) partly migrate onto the surfaces of the oxide particles, the electrons taking part in the reducing reaction and the positive holes taking part in the oxidation reaction as represented by the following formulas, $$\text{semiconductor} + h\nu \rightarrow e^- + p^+ \quad (1)$$

$$e^- + O_2 \rightarrow O^{2-} \quad (2)$$

$$p^+ + H_2O \rightarrow OH + H^+ \quad (3)$$

$$p^+ + OH^- \rightarrow OH \quad (4)$$

A superoxide (O$^{2-}$) formed by the above reaction (2) and hydroxy radicals (OH) formed by the reactions (3) and (4), exhibit strong oxidizing force and work to oxidize organic matters. It is therefore considered that the film is deteriorated due to this oxidation.

In practice, a hydrolyzed product of a titanium alkoxide is usually used for the formation of a layer having a high refractive index in the reflection-reducing film. Here, however, the anatase-type titanium dioxide having large optical activity is easily formed by the hydrolysis of the titanium alkoxide and, besides, it is believed that the hydrolyzed product of the titanium alkoxide is not cured sufficiently and promotes the optical activity.

That is, when the intermediate layer is blended with the titanium dioxide component as described above, the base layer on the lower side tends to be deteriorated by optical oxidation and, as a result, the film tends to be peeled off. In the present invention, the base layer interposed between the intermediate layer and the transparent substrate does not substantially contain organic resin component, in order to prevent optical oxidation of the base layer and, hence, to effectively prevent the film from being peeled off by light.

DETAILED DESCRIPTION OF THE INVENTION

Figure 1:
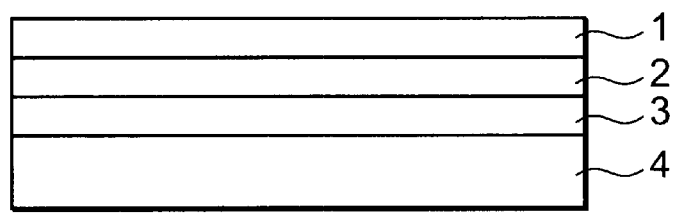
FIG. 1 is a sectional view illustrating the sectional structure of a reflection-reducing film of a three-layer constitution according to the present invention.

Reference is made to FIG. 1 illustrating a reflection-reducing film of the present invention. This reflection-reducing film comprises a light transmitting plastic substrate 4 and three coated layers formed on the substrate including a surface layer 1 having a thickness of from 50 to 200 nm, an intermediate layer 2 having a thickness of from 50 to 200 nm and a base layer 3 having a thickness of from 50 to 200 nm. The surface layer 1 has a low refractive index which is not higher than 1.44, the intermediate layer 2 has a high refractive index which is not smaller than 1.75, and the base layer 3 has a refractive index midway between those of the surface layer 1 and the intermediate layer 2.

Figure 2:
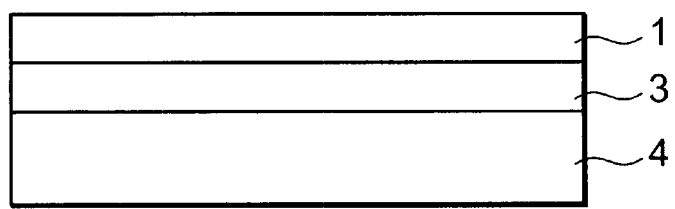
FIG. 2 is a sectional view illustrating the sectional structure of a reflection-reducing film of a two-layer constitution according to the present invention.

The above reflection-reducing film may not have the intermediate layer 2. Referring to FIG. 2 illustrating another example of the reflection-reducing film of the present invention, two layers including a base layer 3 and a surface layer 1 are formed on a substrate 4.

The reflection-reducing films of FIGS. 1 and 2 have thicknesses of the layers and the refractive indexes that are adjusted to lie within the above-mentioned ranges and, hence, exhibit high light ray transmission property (usually, not smaller than 97%) and low light ray reflection property (usually, not larger than 3%).

[Plastic Substrate]

As the plastic substrate 1 though there is no particular limitation, there can be used polymethyl methacrylate, polycarbonate, polyallyl diglycol carbonate, or polystyrene from the standpoint of optical properties, and there can be used the one that is transparent or colored with an oil-soluble dye. The present invention may further use the plastic substrate coated with a primer in order to improve compatibility and adhesion between the reflection film and the substrate.

[Coated Layers]

In this invention, the base layer 3, the intermediate layer 2 and the surface layer 1 are formed in this order on the surface of the light transmitting substrate. As described already, the intermediate layer 2 may be omitted as desired.

As the coating method, a dipping method is preferably used for easily forming thin films. The applied thin films are, usually, heat-treated at a temperature of from about 70 to about 140° C. and is cured to impart toughness thereto.

The compositions to be applied and the solvents are so selected that the underlying base layer 1 will not be dissolved or damaged at the time of applying the intermediate layer 2 and that the underlying intermediate layer 2 or the base layer 1 will not be dissolved or damaged at the time of applying the surface layer.

(Base Layer)

The base layer 3 is called intermediate refractive index layer and, according to the present invention, has a thickness of, generally, from 50 to 200 nm and, particularly, from 60 to 90 nm.

It is further desired that the base layer 3 has a refractive index of, generally, from 1.60 to 1.75.

The base layer 3 should contain a colloidal metal oxide for accomplishing an intermediate refractive index. As the metal oxide sol, there can be exemplified titania sol (titanium oxide sol), alumina sol, zirconium oxide sol and antimony oxide sol. Among them, however, it is desired to use the titanium oxide sol from the standpoint of adjusting the refractive index, dispersion in an organic solvent, stability of the coating solution and adhesiveness to the plastic substrate. The base layer 3 further contains a binder for bonding and securing fine particles in a dispersed state. As the binder, there can be exemplified those other than the so-called organic resins, such as a silane coupling agent of the above-mentioned formula (I) capable of effectively suppressing the deterioration of the titanium oxide caused by the optical activity and, particularly, an epoxysilane coupling agent to which only, however, the binder is in no way limited. The coated layer cured by using the epoxysilane coupling agent further gives an advantage of excellent resistance against solvent at the time of forming the intermediate layer 2 or the surface layer 1.

As the epoxy silane coupling agent, the one of the following formula (II),

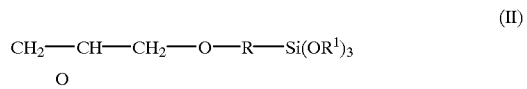

wherein R is an alkylene group, and $R^1$ is an alkyl group or an alkoxyalkyl group, is used. A representative example thereof is a γ-glycidoxypropyltrimethoxysilane.

In order to quicken the hydrolysis of the silane coupling agent, there may be used a dilute aqueous solution of mineral acids such as acetic acid or hydrochloric acid.

Like the surface layer 1, further, the base layer 3 may contain a metal chelate compound, whereby a crosslinked structure is introduced into the base layer 3 to exhibit excellent adhesiveness, resistance against solvent and film strength. The blending amount is preferably from 0 to 20% by weight on the basis of a solid component.

In the present invention, further, it is desired that the base layer 3 is blended with fine particles having an average particle diameter of from 50 to 1000 nm and, particularly, from 100 to 500 nm. By blending the base layer 3 and the surface layer 1 with fine particles having such particle diameters, the reflection-reducing film exhibits enhanced non-glare function effectively blurring the reflected image only without blurring the transmitted image. Any kind of fine particles can be used without limitation provided they have excellent transparency. From the standpoint of light resistance, however, it is desired to use inorganic fine particles. From the standpoint of easy availability, chemical stability and hardness of film, further, a silica sol is particularly preferred. The amount of blending fine particles is preferably in a range of from 0.01 to 10% by weight on the basis of solid components.

An organic solvent can be used as the solvent for the coating composition for forming the base layer. The organic solvent may be compatible with a colloidal metal oxide or a binder, and no particular limitation is imposed on it. As the solvent, there can be used alcohols, ketones, esters or aromatic hydrocarbons. Concrete examples are methanol, propanol, methyl ethyl ketone, methylisobutyl ketone, isobutyl acetate and toluene.

By using these solvents, the concentration of the whole solid components is adjusted to be from 0.1 to 20% by weight of the total weight.

There is no particular limitation on the composition of the base layer 3 provided it contains the above-mentioned metal oxide fine particles in a stably dispersed state and forms a dense and homogeneous coating. In general, however, the composition of the base layer 3 contains the metal oxide fine particles in an amount of from 20 to 90% by weight and the binder (silane coupling agent) in an amount of from 10 to 80% by weight on the basis of solid components, and contains fine particles having the above-mentioned particle diameters in the above-mentioned range (0.01 to 10% by weight) from the standpoint of non-glare function.

The base layer 3 of the above-mentioned composition does not-substantially contain organic resin component and, hence, exhibits excellent light resistance irrespective of the composition of the intermediate layer 2 that will be described below. For example, even when the intermediate layer 2 contains the titanium dioxide component, the base layer 3 is effectively prevented from being optically deteriorated effectively eliminating such an inconvenience as peeling of film.

(Intermediate Layer)

The intermediate layer 2 is located between the underlying layer (base layer) and the surface layer, and is called high refractive index layer. According to the present invention, the intermediate layer is formed usually maintaining a thickness of from 50 to 200 nm and, particularly preferably, from 50 to 90 nm.

It is desired that the intermediate layer 2 has a refractive index of, generally, in a range of from 1.75 to 2.30. The intermediate layer 2 that contains the silica sol exhibits improved adhesion to the surface layer 1.

It is desired that the intermediate layer 2 contains a metal alkoxide which undergoes the hydrolysis by itself to form a metal oxide and, besides, forms a dense film.

It is desired that the metal alkoxide is expressed by the following formula (III),

M(OR)m                                    (III)

wherein M is a metal, R is a hydrocarbon group having 1 to 5 carbon atoms, and m is an atomic valency (3 or 4) of the metal M.

Preferred examples of the metal M include titanium, aluminum, zirconium and tin, and, particularly, titanium.

Concrete examples of the metal alkoxide include titanium methoxide, titanium ethoxide, titanium n-propoxide, titanium isopropoxide, titanium n-butoxide, titanium isobutoxide, aluminum ethoxide, aluminum isopropoxide, aluminum butoxide, aluminum t-butoxide, tin t-butoxide, zirconium ethoxide, zirconium n-propoxide, zirconium isopropoxide and zirconium n-butoxide.

The intermediate layer 2 may contain a metal halide in order to increase the refractive index. As the metal halide, there are used a metal chloride or a metal bromide. More concretely, there can be used antimony trichloride, zirconium tetrachloride, bismuth trichloride, titanium tetrabromide, germanium tetrachloride, antimony tribromide and tantalum pentachloride. From the standpoint of a high refractive index, dispersion property in an organic solvent and stability of the coating solution, it is desired to use antimony trichloride, bismuth trichloride or antimony tribromide.

The intermediate layer 2 may further contain a thermosetting resin as a binder. As the thermosetting resin, there can be exemplified phenol-formaldehyde resin, furan-formaldehyde resin, xylene-formaldehyde resin, ketone-formaldehyde resin, urea formaldehyde resin, melamine-formaldehyde resin, alkyd resin, unsaturated polyester resin, epoxy resin, bismaleimide resin, triallyl cyanurate resin, thermosetting acrylic resin, silicone resin and urethane resin. These resins may be used in a single kind or in a combination of two or more kinds. The above thermosetting resin used as the binder has an advantage of exhibiting resistance against oxidation caused by optical activity.

Further, a silane coupling agent may be contained in order to improve the adhesiveness on the interface between the binder and the metal oxide formed by hydrolysis.

As the silane coupling agent, there is used the one represented by the above formula (I) or the one represented by the following formula (IV),

$R_n$—Si(OR$^1$)$_{4-n}$                                (IV)

wherein R is an alkyl group, an aminoalkyl group or an alkenyl group, $R^1$ is an alkyl group or an alkoxyalkyl group, and n is a number of from 1 to 3, such as methyltrimethoxysilane or vinyltrimethoxysilane.

An organic solvent can be used as the solvent even for the coating composition for forming the intermediate layer 2. The kind of the organic solvent and the concentration of the coating solution are the same as those described concerning the base layer 3.

There is no particular limitation on the composition of the intermediate layer 2 provided it contains the above-mentioned components in a stable state and forms a dense and homogeneous film. In general, however, the intermediate layer 2 contains a metal alkoxide in an amount of from 50 to 90% by weight, a metal halide in an amount of from 5 to 50% by weight, a binder in an amount of from 0 to 20% by weight, a silane coupling agent in an amount of from 0.0001 to 20% by weight and a silica sol in an amount of from 0 to 20% by weight on the basis of solid components.

(Surface Layer)

The surface layer 1 is a low refractive index layer which, according to the present invention, is formed maintaining a thickness of, generally, from 50 to 200 nm and, particularly preferably, from 70 to 110 nm.

It is desired that the surface layer 1 has a refractive index of, generally, from 1.29 to 1.44.

The surface layer 1 contains, as the binder, a silane coupling agent which by itself undergoes hydrolysis to form a siliceous film having resistance against acid, resistance against alkali and resistance against electrolyte.

As the silane coupling agent, there is used a compound represented by the above-mentioned formula (I),

$R_n$—Si(X)$_{4-n}$                                    (I)

wherein R is a substituted or unsubstituted alkyl group or a substituted or unsubstituted alkenyl group, X is a hydrolyzable group, and n is a number of 1 or 2.

As the group (R), there can be used an alkyl group such as methyl group, ethyl group or propyl group, or an alkenyl group such as vinyl group. The alkyl group or the alkenyl group may be substituted with a halogen atom such as chlorine, or a functional group such as mercapto group, amino group, (meth)acryloyl group or oxirane ring-containing group.

As the hydrolyzable group (X), there can be exemplified alkoxy group, alkoxyalkoxy group, acyloxy group and halogen atom.

Concrete examples include vinyltrichlorosilane, vinyltris (β-methoxyethoxy)silane, vinyltriethoxysilane, vinyltrimethoxysilane, vinyltriacetoxysilane, γ-methacryloxypropyltrimethoxysilane, γ-glycidoxypropyltrimethoxysilane, β-(3,4-epoxycyclohexyl)ethyltrimethoxysilane, γ-glycidoxypropylmethyldiethoxysilane, γ-aminopropyltriethoxysilane, γ-aminopropylmethyldimethoxysilane, N-(β-aminoethyl)-γ-aminopropyltrimethoxysilane, γ-anilinopropyltrimethoxysilane, γ-(N-styrylmethyl-β-aminoethylamino)propyltrimethoxysilane hydrochloride salt, γ-chloropropyltrimethoxysilane, γ-mercaptopropyltrimethoxysilane, methyltrimethoxysilane, methyltrichlorosilane, and dimethyldichlorosilane.

In order to decrease the refractive index of the surface layer 1 and to increase the film strength of the surface layer 1, it is desired that the surface layer contains a silica sol having a low refractive index and, particularly, silica sol with internal cavities having a refractive index of not larger than 1.44 and particle diameters of from 5 to 200 nm.

The surface layer further contains a metal chelate compound in order to increase the density, strength and hardness.

As the metal chelate compound, there can be used a compound of titanium, zirconium, aluminum, tin, niobium, tantalum or lead containing a bidentate ligand. The bidentate ligand is a chelating agent having a coordination number of two, i.e., having two atoms that are coordinated in a metal and, generally, forms a chelate compound capable of forming a five- to seven-membered ring with O, N or S atoms.

Examples of the bidentate ligand include acetylacetonato, ethylacetoacetonato, diethylmalonato, dibenzoylmethanato, salicylato, glycolato, catecolato, salicylaldehidato, oxyacetophenonato, biphenolato, pyromeconato, oxynaphthoquinonato, oxyanthraquinonato, tropolonato, binokitilato, glycinato, araninato, anthroninato, picolinato, aminophenolato, ethanolaminato, mercaptoethylaminato, 8-oxyquinolinato, alicylaldiminato, benzoynoxymato, salicylaldoxymato, oxyazobenzenato, phenylazonaphtholato, β-nitroso-α-naphtholato, diazoaminobenzenato, biuretato, diphenylcarbazonato, diphenylthiocarbazonato, biguanidato and dimethylglyoximato to which only, however, the bidentate ligand is in no way limited.

A preferred metal chelate compound is represented by the general formula (V),

$$M(Li)_k(X)_{m-k} \qquad (V)$$

wherein M is titanium, zirconium, aluminum, tin, niobium, tantalum or lead, Li is a bidentate ligand, X is a monovalent group and, preferably, a hydrolyzable group, m is a valency of a metal M, and k is a number of not smaller than 1 in a range of not exceeding the valency of the metal M.

Concretely, the following compounds can be used.

Titanium chelate compounds such as triethoxy.mono(acetylacetonato)titanium, tri-n-propoxy.mono(acetylacetonato)titanium, tri-i-propoxy.mono(acetylacetonato)titanium, tri-n-butoxy.mono(acetylacetonato)titanium, tri-sec-butoxy.mono(acetylacetonato)titanium, tri-t-butoxy.mono(acetylacetonato)titanium, diethoxy.bis(acetylacetonato)titanium, di-n-propoxy.bis(acetylacetonato)titanium, di-i-propoxy.bis(acetylacetonato)titanium, di-n-butoxy.bis(acetylacetonato)titanium, di-sec-butoxy.bis(acetylacetonato)titanium, di-t-butoxy.bis(acetylacetonato)titanium, monoethoxy.tris(acetylacetonato)titanium, mono-n-propoxy.tris(acetylacetonato)titanium, mono-i-propoxy.tris(acetylacetonato)titanium, mono-n-butoxy.tris(acetylacetonato)titanium, mono-sec-butoxy.tris(acetylacetonato)titanium, mono-t-butoxy.tris(acetylacetonato)titanium, tetrakis(acetylacetonato)titanium, triethoxy.mono(ethylacetoacetato)titanium, tri-n-propoxy.mono(ethylacetoacetato)titanium, tri-i-propoxy.mono(ethylacetoacetato)titanium, tri-n-butoxy.mono(ethylacetoacetato)titanium, tri-sec-butoxy.mono(ethylacetoacetato)titanium, tri-t-butoxy.mono(ethylacetoacetato)titanium, diethoxy.bis(ethylacetoacetato)titanium, di-n-propoxy.bis(ethylacetoacetato)titanium, di-i-propoxy.bis(ethylacetoacetato)titanium, di-n-butoxy.bis(ethylacetoacetato)titanium, di-sec-butoxy.bis(ethylacetoacetato)titanium, di-t-butoxy.bis(ethylacetoacetato)titanium, monoethoxy.tris(ethylacetoacetato)titanium, mono-n-propoxy.tris(ethylacetoacetato)titanium, mono-i-propoxy.tris(ethylacetoacetato)titanium, mono-n-butoxy.tris(ethylacetoacetato)titanium, mono-sec-butoxy.tris(ethylacetoacetato)titanium, mono-t-butoxy.tris(ethylacetoacetato)titanium, tetrakis(ethylacetoacetato)titanium, mono(acetylacetonato)tris(ethylacetoacetato)titanium, bis(acethylacetonato)bis(ethylacetoacetato)titanium, and tris(acethylacetonato)mono(ethylacetoacetato)titanium; as well as triethoxy.mono(acetylacetonato)zirconium, tri-n-propoxy.mono(acetylacetonato)zirconium, tri-i-propoxy.mono(acetylacetonato)zirconium, tri-n-butoxy.mono(acetylacetonato)zirconium, tri-sec-butoxy.mono(acetylacetonato)zirconium, tri-t-butoxy.mono(acetylacetonato)zirconium, diethoxy.bis(acetylacetonato)zirconium, di-n-propoxy.bis(acetylacetonato)zirconium, di-i-propoxy.bis(acetylacetonato)zirconium, di-n-butoxy.bis(acetylacetonato)zirconium, di-sec-butoxy.bis(acetylacetonato)zirconium, di-t-butoxy.bis(acetylacetonato)zirconium, monoethoxy.tris(acetylacetonato)zirconium, mono-n-propoxy.tris(acetylacetonato)zirconium, mono-i-propoxy.tris(acetylacetonato)zirconium, mono-n-butoxy.tris(acetylacetonato)zirconium, mono-sec-butoxy.tris(acetylacetonato)zirconium, mono-t-butoxy.tris(acetylacetonato)zirconium, tetrakis(acetylacetonato)zirconium, triethoxy.mono(ethylacetoacetato)zirconium, tri-n-propoxy.mono(ethylacetoacetato)zirconium, tri-i-propoxy.mono(ethylacetoacetato)zirconium, tri-n-butoxy.mono(ethylacetoacetato)zirconium, tri-sec-butoxy.mono(ethylacetoacetato)zirconium, tri-t-butoxy.mono(ethylacetoacetato)zirconium, diethoxy.bis(ethylacetoacetato)zirconium, di-n-propoxy.bis(ethylacetoacetato)zirconium, di-i-propoxy.bis(ethylacetoacetato)zirconium, di-n-butoxy.bis(ethylacetoacetato)zirconium, di-sec-butoxy.bis(ethylacetoacetato)zirconium, di-t-butoxy.bis(ethylacetoacetato)zirconium, monoethoxy.tris(ethylacetoacetato)zirconium, mono-n-propoxy.tris(ethylacetoacetato)zirconium, mono-i-propoxy.tris(ethylacetoacetato)zirconium, mono-n-butoxy.tris(ethylacetoacetato)zirconium, mono-sec-butoxy.tris(ethylacetoacetato)zirconium, mono-t-butoxy.tris(ethylacetoacetato)zirconium, tetrakis(ethylacetoacetato)zirconium, mono(acetylacetonato)tris(ethylacetoacetato)zirconium, bis(acetylacetonato)bis(ethylacetoacetato)zirconium, tris(acetylacetonato)mono(ethylacetoacetato)zirconium, diethoxy.mono(acetylacetonato)aluminum, monoethoxy.bis(acetylacetonato)aluminum, di-i-propoxy.mono(acetylacetonato)aluminum, mono-i-propoxy.bis(acetylacetonato)aluminum, mono-i-propoxy.bis(ethylacetoacetato)aluminum, monoethoxy.bis(ethylacetoacetato)aluminum, diethoxy.mono(ethylacetoacetato)aluminum and di-i-propoxy.mono(ethylacetoacetato)aluminum.

An organic solvent can be used as the solvent even for the coating composition for forming the surface layer 1. The kind of the organic solvent and the concentration of the coating solution are the same as those described with reference to the base layer 3.

There is no particular limitation on the composition of the surface layer 1 provided it contains the above-mentioned components in a stable state and forms a dense and homogeneous film. Generally, however, it is desired that the composition of the surface layer 1 contains a silane coupling agent in an amount of from 30 to 95% by weight, silica sol particles having a low refractive index in an amount of from 5 to 60% by weight and a metal chelate compound in an amount of from 0.1 to 20% by weight on the basis of solid components.

In the present invention, further, it is desired that the surface layer 1, too, is blended with fine particles having an average particle diameter of from 50 to 1000 nm and, particularly, from 100 to 500 nm like the above-mentioned base layer 3. With the base layer 3 and the surface layer 1 being blended with fine particles having such particle diameters, the reflection-reducing film exhibits enhanced non-glare function and effectively blurs the reflected image only without blurring the transmitted image. Any kind of fine particles can be used provided they have excellent transparency as described with reference to the base layer 3. Inorganic particles, particularly silica zols are preferably used as the fine particles. Among the above-mentioned silica sols having low refractive indexes used for adjusting the refractive index, there can be used those fine particles having an average particle diameter lying within the above-mentioned range. For enhancing the non-glare function, it is desired that the fine particles are blended in an amount of from 0.01 to 10% by weight on the basis of solid components.

(Work of Coating)

In order to form the reflection-reducing film of the present invention, it is important to apply a coating composition having wetting property onto the surface that is to be coated and to prevent the effects caused by the dissolution among the layers and caused by a solvent as much as possible to maintain optical properties on an excellent level.

Additionally described below is a composition that maintains this relationship and is used in Examples.

First, the solvent used for the coating composition of the base layer 1 is, desirably, an alcohol exhibiting wettability for the plastic substrate 4 and having a relatively small dissolving property in a range of enabling the sols to be dispersed therein.

It is further desired that the binder in the base layer 1 has a three-dimensional dense and hard structure so will not to be affected by the coating composition of the intermediate layer 2 or of the surface layer 1. In this sense, it is desired to use an epoxysilane coupling agent.

The coating composition of the intermediate layer 2 shall not adversely affect the base layer 1 that has been formed already, and the intermediate layer 2 that is formed shall not be affected by the coating composition of the base layer 1.

It is desired to use a curable resin binder for the intermediate layer 2 from the standpoint of relaxing the stress and shock to the base layer 3 and to the surface layer 1. The resin binder further relaxes adverse effects caused by the solvent in the coating composition of the surface layer 1.

By taking durability, resistance against contamination, etc. into consideration, the coating composition of the surface layer 1 in the state of a finally formed film, is constituted chiefly by inorganic matters containing little organic components like the base layer 1.

In connection with the fact that the surface layer 1 is chiefly formed of inorganic matters and by taking wettability to the intermediate layer 2 into consideration, the coating composition of the surface layer 1 uses an alcohol solvent such as propanol as the solvent.

The reflection-reducing film of the present invention is not limited to those of the above-mentioned layer constitution only.

Generally, for example, it is desired to provide an undercoated layer between the plastic substrate 4 and the base layer 3. As the undercoated layer, there can be used a coated layer of the thermosetting type or a coated layer of the type of being cured with ultraviolet rays or with electron rays.

The coated layer of the thermosetting type will be the one of the silicone type, isocyanate type or epoxy type. On the other hand, the coated layer of the type of being cured with ultraviolet rays or electron rays will be the one of the urethane acrylate type, epoxyacrylate type or copolymerized acrylate type.

It is further allowable to form an overcoated layer in order to protect the surface layer 1. As the overcoated layer, there can be exemplified an organopolysiloxane material or a coated layer of a fluorine-contained resin for imparting abrasion resistance and scratch resistance.

As the polysiloxane coated layer, there can be exemplified a methyl polysiloxane or a dimethyl polysiloxane having silanol group, alkoxy group, acetyl group, phenyl group, polyether group or perfluoroalkyl group on a side chain.

As the fluorine-contained resin, there is used a perfluoro amorphous fluorine-contained resin and, particularly, a perfluoro amorphous fluorine-contained resin having a ring structure on the side chain.

An adhesive layer may be formed on the back side of the light-transmitting plastic substrate 4. As the adhesive, there can be used the one of the acrylic type, rubber type or silicone type.

EXAMPLES

The invention will now be described in further detail by way of Examples to which only, however, the invention is in no way limited.

In Examples, measurements were taken according to methods described below.

(1) Total light ray transmission factor:

The total light ray transmission factor was measured by using a tester V-550 manufactured by Nippon Bunko Co. over a range of wavelengths of 750 to 400 nm at a scanning rate of 1000 nm/min.

(2) Reflection factor:

The reflection factor was also measured by using the above tester under similar conditions.

(3) Liquid resistance:

The liquid resistance was tested in a manner as described below. The reflection-reducing films were immersed in such testing liquids as tap water, alkaline and acidic artificial sweat solutions and a saline solution containing 5% by weight of table salt at room temperature for 19 to 72 hours. From the conditions of the surfaces of the reflection-reducing films after immersed, the resistance was evaluated on the following basis:

○: Quite no change is recognized on the surface state of the film.

Δ: Traces of dissolution of the film are recognized.

X: Films are dissolved conspicuously.

(4) Easiness for viewing optical display surface:

① Easiness for viewing transmitted light.

The reflection-reducing film was stuck to the CRT surface of a personal computer, and the easiness for viewing the picture was evaluated on the following basis.

1: Vividness of the picture is the same as that of before sticking the reflection-reducing film.

2: The picture is seen slightly whitish and slightly blurred compared to that of before sticking the reflection-reducing film.

3: The picture is seen whitish and blurred compared to that of before sticking the reflection-reducing film.

② Glare.

The sample reflection-reducing film was stuck onto the CRT surface of a personal computer, and a glass plate was placed at the back thereof in order to evaluate whether the surface becomes glaring on the following basis.

1: The reflected image is so blurred that it cannot be almost recognized by eyes.

2: The reflected image is slightly recognizable.

3: The reflected image is clearly recognizable.

(5) Light resistance:

The light resistance was evaluated by conducting the following adhesion testing.

Testing machine: Ultraviolet-ray Long-Life Fadometer, U48-B(H), manufactured by Suga Shikenki Co.

Contents of testing: Temperature, 63° C.±3° C. (blank panel temperature)

Humidity: normal humidity

Irradiation time: 400 hours

The test samples irradiated under the above-mentioned conditions were evaluated concerning the adhesiveness by way of cross-cut tape testing. That is, the surfaces of the samples were split maintaining a gap of 1 mm to form 100 squares each measuring 1 mm. Next, a cellophane adhesive tape was forcibly pushed thereon and was peeled at one time from the surfaces in a direction of 180 degrees, and the remaining squares were counted as an index of adhesion.

Example 1

A polymethyl methacrylate plate (PMMA) having a thickness of 2 mm was coated with two layers in the following order to prepare a two-layer reflection-reducing film.

Base layer (80 nm thick):

A coating solution of the following composition was prepared.

| | |
|---|---|
| Epoxy silane coupling agent (γ-glycidoxypropyltrimethoxysilane) | 2.5% by weight |
| Acetic acid | 0.6% by weight |
| Titanium oxide sol (TiO$_2$ sol) | 2.5% by weight |
| Titanium chelate | 0.05% by weight |
| Propyl alcohol | 94.35% by weight |

The PMMA was dipped in the above solution, and was heat-treated at 100° C. for 120 minutes to form a base layer maintaining a thickness of 80 nm.

Surface layer (100 nm thick):

A coating solution of the following composition was prepared.

| | |
|---|---|
| Epoxy silane coupling agent (γ-Glycidoxypropyltrimethoxysilane) | 1.5% by weight |
| Acetic acid | 0.2% by weight |
| 50 nm SiO$_2$ sol (n$_D$ = 1.34) | 0.9% by weight |
| Titanium chelate | 0.1% by weight |
| Propyl alcohol | 97.3% by weight | note:
n$_D$ means a refractive index

The PMMA on which the base layer has been formed was dipped in the above solution, and was heat-treated at 100° C. for 120 minutes to form a surface layer maintaining a thickness of 100 nm.

Example 2

A polymethyl methacrylate plate (PMMA) having a thickness of 2 mm was coated with three layers in the following order to prepare a three-layer reflection-reducing film.

Base layer (80 nm thick):

A coating solution of the following composition was prepared.

| | |
|---|---|
| Epoxy silane coupling agent (γ-Glycidoxypropyltrimethoxysilane) | 2.5% by weight |
| Acetic acid | 0.6% by weight |
| Titanium oxide sol (TiO$_2$ sol) | 2.5% by weight |
| Aluminum chelate | 0.05% by weight |
| Propyl alcohol | 94.35% by weight |

The PMMA was dipped in the above solution, and was heat-treated at 100° C. for 120 minutes to form a base layer maintaining a thickness of 80 nm.

Intermediate layer (72 nm thick):

A coating solution of the following composition was prepared.

| | |
|---|---|
| Titanium tetraisopropoxide | 7.4% by weight |
| Bismuth chloride | 1.6% by weight |
| Epoxy silane coupling agent (γ-glycidoxypropyltrimethoxysilane) | 0.006% by weight |
| Acetic acid | 0.001% by weight |
| SiO$_2$ sol | 0.4% by weight |
| Propyl alcohol | 90.593% by weight |

The PMMA on which the base layer has been formed was dipped in the above solution, and was heat-treated at 100° C. for 120 minutes to form an intermediate layer maintaining a thickness of 72 nm.

Surface layer (100 nm thick):

A coating solution of the following composition was prepared.

| | |
|---|---|
| Epoxy silane coupling agent (γ-Glycidoxypropyltrimethoxysilane) | 1.5% by weight |
| Acetic acid | 1.2% by weight |
| 50 nm SiO$_2$ sol (n$_D$ = 1.34) | 0.9% by weight |
| Titanium chelate | 0.007% by weight |
| Propyl alcohol | 96.39% by weight |

The PMMA on which the base layer and the intermediate layer have been formed was dipped in the above solution, and was heat-treated at 100° C. for 120 minutes to form a surface layer maintaining a thickness of 100 nm.

Example 3

A polymethyl methacrylate plate (PMMA) having a thickness of 2 mm was coated with three layers in the following order to prepare a three-layer reflection-reducing film.

Base layer (80 nm thick):

A coating solution of the following composition was prepared.

| | |
|---|---|
| Epoxy silane coupling agent (γ-Glycidoxypropyltrimethoxysilane) | 1.9% by weight |
| Acetic acid | 0.4% by weight |
| Titanium oxide sol (TiO$_2$ sol) | 2.4% by weight |
| Propyl alcohol | 95.3% by weight |

The PMMA was dipped in the above solution, and was heat-treated at 100° C. for 120 minutes to form a base layer maintaining a thickness of 80 nm.

Intermediate layer (72 nm thick):

A coating solution of the following composition was prepared.

| | |
|---|---|
| Titanium tetraisopropoxide | 7.4% by weight |
| Tantalum chloride | 1.6% by weight |
| Melamine-formaldehyde resin | 0.4% by weight |
| Toluene | 40.9% by weight |
| Propyl alcohol | 49.7% by weight |

The PMMA on which the base layer has been formed was dipped in the above solution, and was heat-treated at 100° C. for 120 minutes to form an intermediate layer maintaining a thickness of 72 nm.

Surface layer (100 nm thick):

A coating solution of the following composition was prepared.

| | |
|---|---|
| Epoxy silane coupling agent (β-(3,4-epoxycyclohexyl)ethyltrimethoxysilane) | 3.6% by weight |
| Acetic acid | 3.1% by weight |
| 50 nm $SiO_2$ sol ($n_D$ = 1.34) | 0.9% by weight |
| Titanium chelate | 0.2% by weight |
| Propyl alcohol | 92.2% by weight |

The PMMA on which the base layer and the intermediate layer have been formed was dipped in the above solution, and was heat-treated at 100° C. for 120 minutes to form a surface layer maintaining a thickness of 100 nm.

Figure 3:
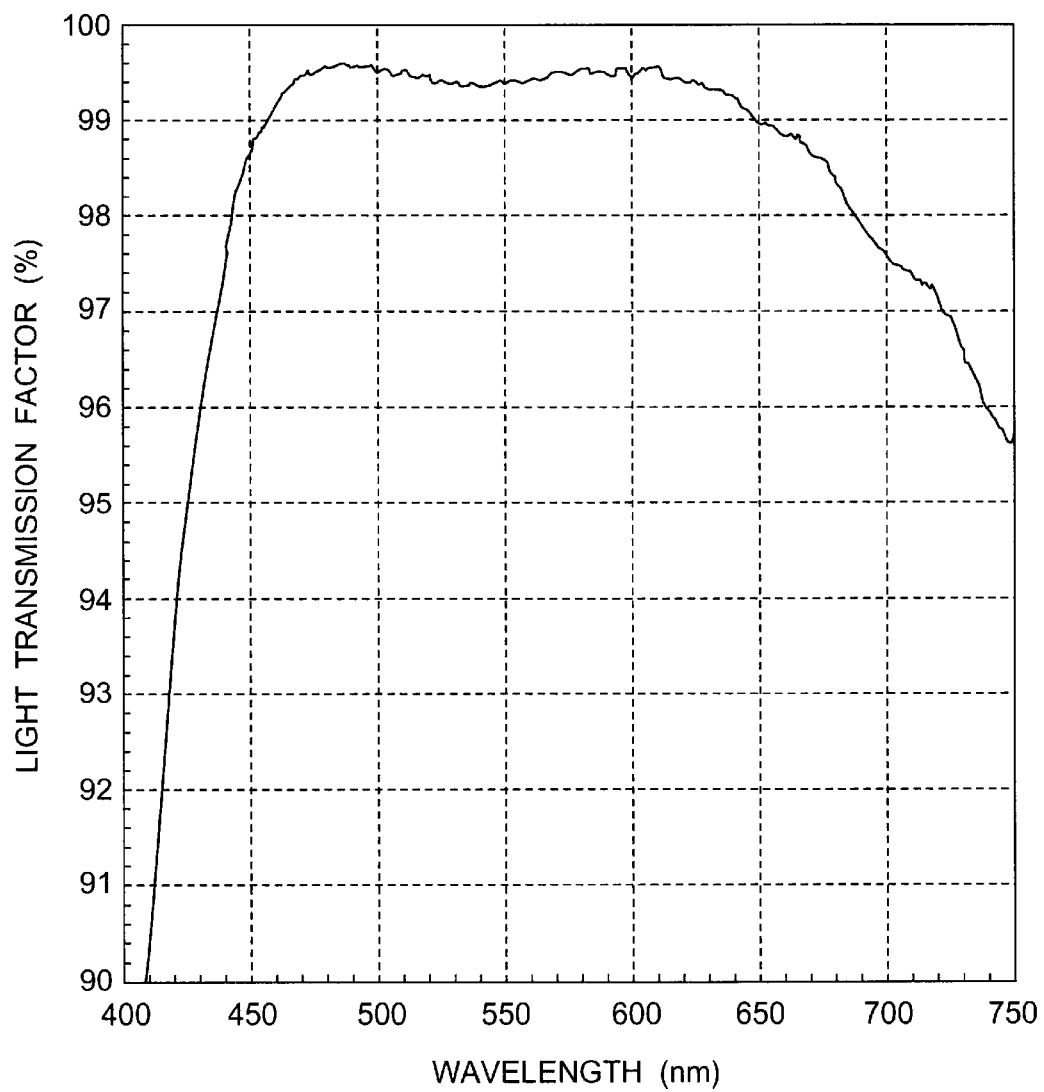
FIG. 3 is a graph illustrating a distribution of the whole light transmission factors through the reflection-reducing film of Example 2.
Figure 4:
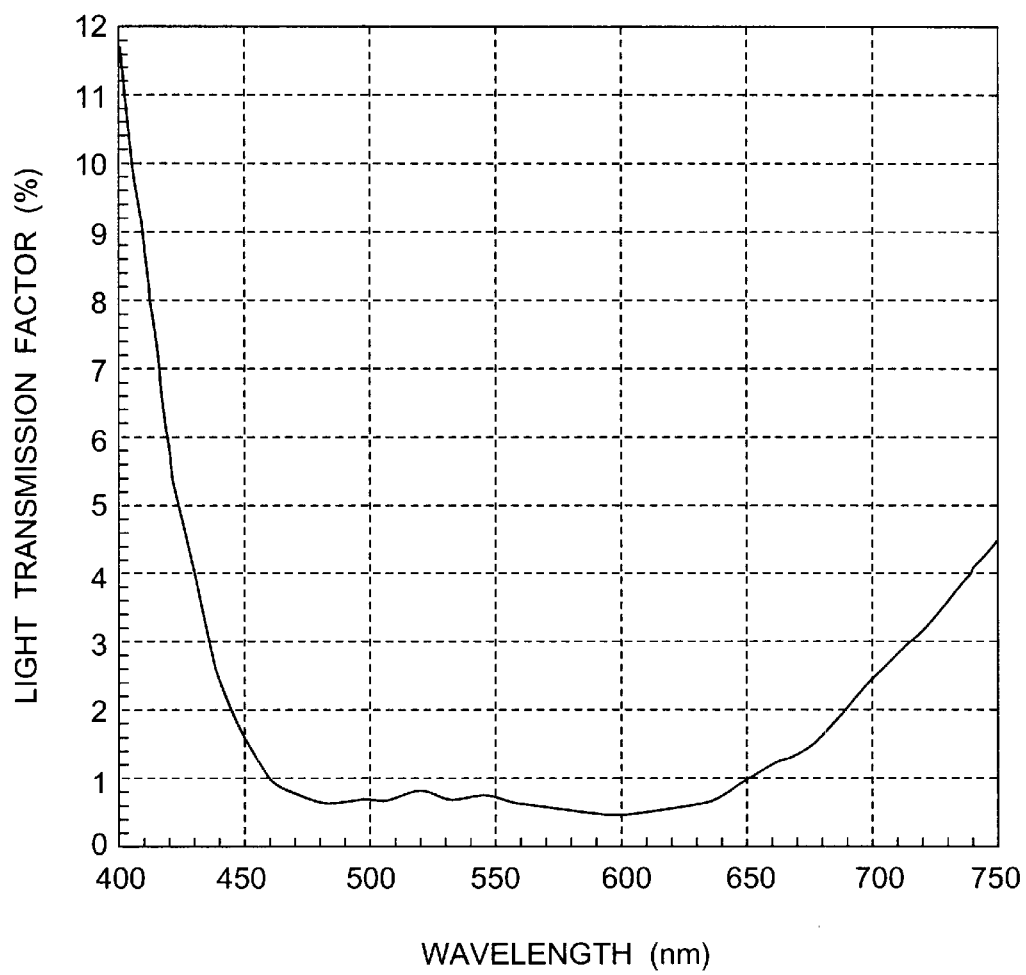
FIG. 4 is a graph illustrating a distribution of the reflection factors through the reflection-reducing film of Example 2.

Table 1 shows the results of liquid resistance of the reflection-reducing films obtained in Examples 1 and 2. FIGS. 3 and 4 show the measured results of the light ray transmission factors and of the reflection factors of the obtained reflection-reducing films.

Comparative Example 1

A polymethyl methacrylate plate (PMMA) having a thickness of 2 mm was coated with three layers in the following order.

Base layer (80 nm thick):

A coating solution of the following composition was prepared.

| | |
|---|---|
| Epoxy silane coupling agent (γ-Glycidoxypropyltrimethoxysilane) | 1.95% by weight |
| Acetic acid | 0.45% by weight |
| Titanium oxide sol ($TiO_2$ sol) | 2.40% by weight |
| Propyl alcohol | 95.20% by weight |

The PMMA was dipped in the above solution, and was heat-treated at 100° C. for 120 minutes to form a base layer maintaining a thickness of 80 nm.

Intermediate layer (72 nm thick):

A coating solution of the following composition was prepared.

| | |
|---|---|
| Titanium tetraisopropoxide | 7.49% by weight |
| Antimony chloride | 1.69% by weight |
| Methyl isobutyl ketone (MIBK) | 40.93% by weight |
| Propyl alcohol | 49.38% by weight |
| Methyltrimethoxysilane | 0.08% by weight |
| n-butylated melamine resin | 0.43% by weight |

The PMMA on which the base layer has been formed was dipped in the above solution, and was heat-treated at 100° C. for 120 minutes to form an intermediate layer maintaining a thickness of 72 nm.

Surface layer (100 nm thick):

A coating solution of the following composition was prepared.

| | |
|---|---|
| Ethyl silicate (tetraethoxysilane) | 4.42% by weight |
| Acetic acid | 4.20% by weight |
| Epoxy silane coupling agent (γ-glycidoxypropyltrimethoxysilane) | 0.28% by weight |
| Propyl alcohol | 90.99% by weight |
| 300 nm $SiO_2$ sol ($n_D$ = 1.34) | 0.01% by weight |

The PMMA on which the base layer and the intermediate layer have been formed was dipped in the above solution, and was heat-treated at 100° C. for 120 minutes to form a surface layer maintaining a thickness of 100 nm.

Table 1 shows the results of liquid resistance of the reflection-reducing film obtained in Comparative Example 1 above.

TABLE 1

| | Example 1 | Example 2 | Example 3 | Comparative Example 1 |
|---|---|---|---|---|
| Tap water | | | | |
| 19 hrs | ○ | ○ | ○ | Δ |
| 28 hrs | ○ | ○ | ○ | X |
| 48 hrs | ○ | ○ | ○ | |
| 72 hrs | ○ | ○ | ○ | |
| Artificial alkaline sweat | | | | |
| 19 hrs | ○ | ○ | ○ | X |
| 28 hrs | ○ | ○ | ○ | film missing |
| 48 hrs | ○ | ○ | ○ | |
| 72 hrs | ○ | ○ | ○ | |
| Artificial acidic sweat | | | | |
| 19 hrs | ○ | ○ | ○ | ○ |
| 28 hrs | ○ | ○ | ○ | Δ |
| 48 hrs | ○ | ○ | ○ | X |
| 72 hrs | ○ | ○ | ○ | film missing |
| NaCl solution containing 5% by wt. of table salt | | | | |
| 19 hrs | ○ | ○ | ○ | X |
| 28 hrs | ○ | ○ | ○ | film missing |
| 48 hrs | ○ | ○ | ○ | |
| 72 hrs | ○ | ○ | ○ | |

Example 4

A polymethyl methacrylate plate (PMMA) having a thickness of 2 mm was coated with three layers in the following order to prepare a three-layer reflection-reducing film.

Base layer (80 nm thick):

A coating solution of the following composition was prepared.

| | |
|---|---|
| Epoxy silane coupling agent (γ-Glycidoxypropyltrimethoxysilane) | 1.950% by weight |
| 0.05 N HCL | 0.450% by weight |
| Titanium oxide sol ($TiO_2$ sol) | 2.400% by weight (solid component) |
| Propyl alcohol | 95.189% by weight |
| 300 nm $SiO_2$ sol | 0.011% by weight (solid component) |

The PMMA was dipped in the above solution, and was heat-treated at 100° C. for 120 minutes to form a base layer maintaining a thickness of 80 nm.

Intermediate layer (72 nm thick):

A coating solution of the following composition was prepared.

| | |
|---|---|
| Titanium tetraisopropoxide | 7.492% by weight |
| Bismuth chloride | 1.692% by weight |
| Toluene | 40.925% by weight |
| Propyl alcohol | 49.375% by weight |
| Methyltrimethoxysilane (silane coupling agent) | 0.083% by weight |
| n-butylated melamine resin | 0.350% by weight |

The PMMA on which the base layer has been formed was dipped in the above solution, and was heat-treated at 100° C. for 120 minutes to form an intermediate layer maintaining a thickness of 72 nm.

Surface layer (100 nm thick):

A coating solution of the following composition was prepared.

| | |
|---|---|
| Epoxy silane coupling agent (γ-Glycidoxypropyltrimethoxysilane) | 4.667% by weight |
| 0.05 N HCL | 4.175% by weight |
| 50 nm $SiO_2$ sol ($n_D$ = 1.34) | 0.750% by weight (solid component) |
| Propyl alcohol | 90.396% by weight |
| 300 nm $SiO_2$ sol | 0.011% by weight (solid component) |

The PMMA on which the base layer and the intermediate layer have been formed was dipped in the above solution, and was heat-treated at 100° C. for 120 minutes to form a surface layer maintaining a thickness of 100 nm.

The thus obtained reflection-reducing film was evaluated for its easiness of seeing transmitted light to be 1 and was further evaluated for its glare to be 1.

Example 5

A reflection-reducing film was prepared in the same manner as in Example 4 but replacing the $SiO_2$ sol having a particle diameter of 300 nm used in the base layer and in the surface layer by an $SiO_2$ sol having a particle diameter of 120 nm, and changing the amounts of addition into 0.0022% by weight (base layer) and 0.0024% by weight (surface layer), respectively.

The obtained reflection-reducing film was evaluated for its easiness of seeing transmitted light to be 1 and for its glare to be 1. Concerning the light ray transmission property and reflection-reducing property, however, the reflection-reducing film of Example 5 was superior to the reflection-reducing film of Example 4.

Example 6

A reflection-reducing film was prepared in the same manner as in Example 4 but changing the amount of addition of the $SiO_2$ sol having a particle diameter of 300 nm used in the base layer into 0.0022% by weight and replacing the $SiO_2$ sol having a diameter of 300 nm used in the surface layer by an $SiO_2$ sol having a particle diameter of 120 nm and changing its amount into 0.0024% by weight.

The obtained reflection-reducing film was evaluated for its easiness of seeing transmitted light to be 1 and for its glare to be 1. Concerning the light ray transmission property and reflection-reducing property, however, the reflection-reducing film of Example 6 was superior to the reflection-reducing film of Example 4.

Example 7

A reflection-reducing film was prepared in the same manner as in Example 4 but using a polycarbonate plate (PC) instead of the PMMA plate.

The obtained results were the same as those of Example 4.

Example 8

A reflection-reducing film was prepared in the same manner as in Example 5 but using a polycarbonate plate (PC) instead of the PMMA plate.

The obtained results were the same as those of Example 5.

Example 9

A reflection-reducing film was prepared in the same manner as in Example 6 but using a polycarbonate plate (PC) instead of the PMMA plate.

The obtained results were the same as those of Example 6.

Comparative Example 2

A reflection-reducing film was prepared by vaporizing a reflection-reducing sheet on both surfaces of the PMMA plate which has ruggedness formed on one surface thereof as a unitary structure.

The reflection-reducing film was evaluated for its easiness of seeing transmission light to be 3 and glare to be 3.

Table 2 shows light transmission factors and Haze values of the reflection-reducing plates obtained in Examples 4 to 6 and in Comparative Example 2 for the light of a wavelength of 550 nm.

TABLE 2

| | Example 4 | Example 5 | Example 6 | Comp. Ex. 2 |
|---|---|---|---|---|
| Light transmission factor (%) | 94.2 | 99.2 | 98.6 | 88.4 |
| Haze value | 2.18 | 0.13 | 0.34 | 8.77 |

Example 10

A polymethyl methacrylate plate (PMMA) having a thickness of 2 mm was coated with three layers in the following order to prepare a three-layer reflection-reducing film.

Base layer (80 nm thick):

A coating solution of the following composition was prepared.

| | |
|---|---|
| Epoxy silane coupling agent (γ-Glycidoxypropyltrimethoxysilane) | 1.950% by weight |
| 0.05 N HCL | 0.450% by weight |
| Titanium oxide sol ($TiO_2$ sol) | 2.400% by weight (solid component) |
| Propyl alcohol | 95.200% by weight |

The PMMA was dipped in the above solution, and was heat-treated at 100° C. for 120 minutes to form a base layer maintaining a thickness of 80 nm.

Intermediate layer (72 nm thick):

A coating solution of the following composition was prepared.

| | |
|---|---|
| Titanium isopropoxide | 7.492% by weight |
| Bismuth chloride | 1.692% by weight |
| Toluene | 40.925% by weight |
| Propyl alcohol | 49.375% by weight |
| Methyltrimethoxysilane (silane coupling agent) | 0.083% by weight |
| n-butylated melamine resin | 0.433% by weight |

The PMMA on which the base layer has been formed was dipped in the above solution, and was heat-treated at 100° C. for 120 minutes to form an intermediate layer maintaining a thickness of 72 nm.

Surface layer (100 nm thick):

A coating solution of the following composition was prepared.

| | |
|---|---|
| Epoxy silane coupling agent (γ-Glycidoxypropyltrimethoxysilane) | 4.698% by weight |
| 0.05 N HCL | 4.202% by weight |
| Propyl alcohol | 90.989% by weight |
| 120 mu SiO$_2$ sol (n$_D$ = 1.34) | 0.011% by weight (solid component) |

The PMMA on which the base layer and the intermediate layer have been formed was dipped in the above solution, and was heat-treated at 100° C. for 120 minutes to form a surface layer maintaining a thickness of 100 nm.

The thus obtained reflection-reducing film was evaluated for its light resistance relying upon the adhesion testing. The number of the squares that remained was 100 (100/100) among 100 squares, from it was recognized that the reflection-reducing film possessed an excellent light resistance.

Example 11

A reflection-reducing film was prepared in the same manner as in Example 10 but changing the coating recipe of the layers of Example 10 in a manner as described below.

Base layer (80 nm thick):

| | |
|---|---|
| Epoxy silane coupling agent (γ-Glycidoxypropyltrimethoxysilane) | 1.150% by weight |
| 0.05 N HCL | 0.27% by weight |
| Titanium oxide sol (TiO$_2$ sol) | 3.2% by weight (solid component) |
| Propyl alcohol | 95.38% by weight |

Intermediate layer (72 nm thick):

| | |
|---|---|
| Titanium tetrabutoxide | 7.14% by weight |
| Antimony chloride | 1.61% by weight |
| Toluene | 41.15% by weight |
| Propyl alcohol | 49.64% by weight |
| Methyltrimethoxysilane (silane coupling agent) | 0.11% by weight |
| n-butylated melamine resin | 0.35% by weight |

Surface layer (100 nm thick):

| | |
|---|---|
| Epoxy silane coupling agent (γ-Glycidoxypropyltrimethoxysilane) | 4.12% by weight |
| 0.05 N HCL | 3.68% by weight |
| 120 nm SiO$_2$ sol (n$_D$ = 1.34) | 1.24% by weight |
| Propyl alcohol | 90.96% by weight |

The thus obtained reflection-reducing film was evaluated for its light resistance relying upon the adhesion testing. The number of the squares that remained was 100 (100/100) among 100 squares, from it was recognized that the reflection-reducing film possessed an excellent light resistance like the reflection-reducing film of Example 10.

What is claimed is:

1. A reflection-reducing film formed by being applied onto a surface of a substrate having light transmitting property, and including a base layer formed on the surface of said substrate and a surface layer formed on an upper side of said base layer, wherein:

said base layer has a thickness of from 50 to 200 nm; and said surface layer has a thickness of from 50 to 200 nm and a refractive index of from 1.29 to 1.44 and is formed of a hydrolyzed product of a silane compound represented by the following formula (I), $$R_n\text{—Si}(X)_{4-n} \quad (I)$$

wherein R is a substituted or unsubstituted alkyl group or a substituted or unsubstituted alkenyl group, X is a hydrolyzable group, and n is a number of 1 or 2, a metal chelate compound represented by the formula (II)

$$M(Li)_k(X)_{m-k} \quad (II)$$

wherein M is titanium, zirconium, aluminum, tin, niobium, tantalum or lead, Li is a bidentate ligand, X is a monovalent hydrolyzable group, m is a valency of a metal M, and k is a number of not smaller than 1 in a range of not exceeding the valency of the metal, and a silica sol having a refractive index of not larger than 1.44 and a particle diameter of from 5 to 200 nm, said surface layer containing said hydrolyzed product of the silane compound in an amount of from 30 to 95% by weight, said silica sol particles in an amount of from 5 to 60% by weight and said metal chelate compound in an amount of from 0.1 to 20% by weight on the basis of solid components of the layer, and said base layer having a thickness of from 50 to 200 nm, refractive index of from 1.60 to 1.75 and containing titanium oxide sol in an amount of from 20 to 90% by weight and a hydrolyzed product of a silane compound represented by the formula (I) in an amount of from 10 to 80% by weight, but without containing any organic resin component in the base layer.

2. A reflection-reducing film according to claim 1, wherein the silica sol in said surface layer has internal cavities.

3. A reflection-reducing film according to claim 1, wherein an intermediate layer having a thickness of 50 to 200 nm is provided between said base layer and said surface layer.

4. A reflection-reducing film according to claim 3, wherein said intermediate layer has a refractive index of from 1.75 to 2.30 and contains a hydrolyzed product of metal alkoxide of the following formula (III)

$$M(OR)_m \quad (III)$$

wherein M is a metal selected from the group consisting of titanium, zirconium and aluminum, R is a hydrocarbon group having 1 to 5 carbon atoms, and m is an atomic valency of the metal M, in an amount of from 50 to 90% by weight and contains a metal chloride or a metal bromide in an amount of from 5 to 50% by weight on the basis of solid components of the intermediate layer.

5. A reflection-reducing film according to claim 3, wherein said intermediate layer further contains a hydrolyzed product of a silane compound represented by the formula (I) and a silane sol.

6. A reflection-reducing film according to claim 4, wherein said surface layer and said base layer further contains silica sol particles having an average particle diameter of from 50 to 1000 μm being dispersed in said layers.

7. A reflection-reducing film according to claim 4, wherein the metal chloride or the metal bromide in the intermediate layer is selected from the group consisting of an antimony trichloride, a zirconium tetrachloride, a bismuth trichloride, a titanium tetrabromide, a germanium tetrachloride, an antimony tribromide and a tantalum pentachloride.

8. A reflection-reducing film according to claim 4, wherein said intermediate layer further contains the hydrolyzed product of a silane compound represented by the formula (I) in claim 1.

9. A reflection-reducing film according to claim 4, wherein said intermediate layer further contains organic thermosetting resin.

10. A reflection-reducing film according to claim 9, wherein said organic thermosetting resin is selected from the group consisting of a phenol-formaldehyde resin, a furan-formaldehyde resin, a zylene-formaldehyde resin, a ketone-formaldehyde resin, a urea-formaldehyde resin, a melamine-formaldehyde resin, an alkyd resin, an unsaturated polyester resin, an epoxy resin, a bismareimide resin, a triallyl cyanurate resin, a thermosetting acrylic resin, a silicone resin, a urethane resin and a resin composition of two or more thereof.

11. A reflection-reducing film according to claim 4, wherein said intermediate layer further contains a silica sol.

12. A reflection-reducing film according to claim 1, wherein said base layer further contains a metal chelate compound represented by the formula (II) of claim 1.

13. A reflection-reducing film according to claim 1, wherein the substrate is a plastic substrate having light transmitting property.

14. A reflection-reducing film according to claim 13, wherein the plastic substrate is selected from the group consisting of a polymethylmethacrylate, a polycarbonate, a polyallyl diglycol carbonate and a polystyrene.

* * * * *